United States Patent
York

(10) Patent No.: US 6,806,662 B1
(45) Date of Patent: Oct. 19, 2004

(54) MULTIPLE MODE UNIVERSAL POWER SOURCE UTILIZING A ROTATING MACHINE

(75) Inventor: Douglas S. York, Langley, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/447,912

(22) Filed: May 28, 2003

(51) Int. Cl.$^7$ .................................................. H02P 1/18
(52) U.S. Cl. ....................... 318/254; 318/138; 318/439; 363/65; 363/71; 363/124
(58) Field of Search ................................. 318/138, 439, 318/254; 363/65, 69, 70, 71, 124, 129

(56) References Cited

U.S. PATENT DOCUMENTS

| | | | | |
|---|---|---|---|---|
| 4,499,533 A | * | 2/1985 | Okamoto | 363/126 |
| 5,218,522 A | * | 6/1993 | Phelps et al. | 363/124 |
| 5,684,391 A | * | 11/1997 | Weinfurtner et al. | 323/282 |
| 5,969,966 A | * | 10/1999 | Sawa et al. | 363/163 |
| 6,104,624 A | * | 8/2000 | Iwamoto et al. | 363/71 |
| 6,286,609 B1 | * | 9/2001 | Carrier et al. | 173/1 |
| 6,466,468 B1 | * | 10/2002 | York | 363/65 |
| 6,621,721 B2 | * | 9/2003 | York | 363/65 |
| 6,690,588 B2 | * | 2/2004 | York | 363/65 |

\* cited by examiner

*Primary Examiner*—Rina Duda
(74) *Attorney, Agent, or Firm*—Black Lowe & Graham PLLC

(57) ABSTRACT

A programmable motor controller for receiving three-phase input power at an input power frequency and having a polarity is presented. The controller includes a primary chopper for reversing each phase of electrical power according to a reference frequency. Each primary chopper has a power input, a signal input, and an output. The power input is electrically connected in wye connection to each phase of power. A transformer for each phase of power has primary and secondary terminals and is connected electrically by its primary terminals to the output of the primary chopper. A secondary chopper for each phase of power is configured to reverse each phase or electrical power according to the reference frequency and phase shifted according to a second reference signal. The secondary chopper has an input connected electrically to the secondary terminals of the transformer in an output connected to a winding of a motor.

26 Claims, 4 Drawing Sheets

MULTIPLE MODE UNIVERSAL POWER SOURCE UTILIZING A ROTATING MACHINE

FIELD OF THE INVENTION

This invention relates generally to prime movers and, more specifically, to controlling induction motors.

BACKGROUND OF THE INVENTION

The AC induction motor is the workhorse of industry. AC induction motors are simple, rugged, and easily maintained. They are inexpensive to construct and because they are inexpensive they are the motor choice for 90% of all applications in industry.

By itself the AC induction motor has two shortcomings. First, the AC induction motor is not a true constant speed machine. The motor when turning under a load will always turn at a rotational frequency less then that of the rotational frequency of the magnetic field within the motor. Second, the motor is not by itself inherently capable of providing variable speed operation. Several factors indicate the speed of the turning motor including the frequency of the input power, the nature of the load and the current available. Both of these characteristics are the result of a phenomenon known as slip.

The AC induction motor includes two basic assemblies, the stator and the rotor. The stator assembly includes steel laminations shaped to form poles. Copper wire coils are wrapped around these poles to form primary windings to be connected to a voltage source thereby producing a rotating magnetic field. The rotor assembly is made of laminations formed around a steel shaft core. Radial slots around the laminations' periphery have rotor bars, i.e. conductors shorted at the ends positioned parallel to the shaft. The arrangement of these rotor bars is reminiscent of an exercise wheel for pet rodents giving the configuration a nickname "squirrel cage".

Torque within the induction motor is developed as the result of the interaction of currents induced in the rotor bars with the rotating magnetic field. Because the induction is necessary, in operation the rotor speed always lags behind the magnetic field speed, allowing the rotor bars to cut magnetic lines of force and produce useful torque. The different between the rotating speed of the magnetic field and the speed of the rotor is known as the slip speed and varies with load because of the resultant increase need for torque. Because of this variability of the produced speed based on input power of a constant frequency, precise control of the induction motor is difficult.

One solution is the adjustable speed control usually based on pulse width modulation. The constant alternating current ("A.C.") line voltage of 60 or 50 cycles per second from the supply network is rectified, filtered, and then converted into a variable voltage at a variable frequency. Adjusting the frequency and voltage according to the needed output of the motor has proven to be a successful strategy for control. Using a load torque signal added to the speed controller allows slip compensation proportional to the load. When optimized, the slip can be reduced to about 0.5%.

The disadvantage of the adjustable speed control is that it is generally necessary to rectify alternating current to direct current before being able to generate variable frequency power. Doing so requires rectifying the A.C. line voltage to direct current ("D.C.") and then "chopping" the power according to the needed frequency. In each of the two stages inefficiencies are introduced making the use of the induction motor more costly over its life.

U.S. Pat. No. 6,466,468 issued to Douglas York on Oct. 15, 2002 presented a novel means of producing variable frequency power without rectifying that power to direct current. The teaching of the York patent, incorporated by this reference, is to chop power to a frequency significantly above the range of frequencies necessary to drive the motor for the application and by means of phase shifting the chopped power producing a power wave form represents the product of the input power at the input frequency multiplied by a reference sinusoid at an appropriate frequency to produce power of a desired frequency. This method is proved to be inherently more efficient then rectifying to direct current.

When uses motor controller however, the system taught in the York patent requires a one-to-one correspondence between the primary chopping phase and the secondary chopping phase. This requirement for one-to-one correspondence prevents the use of a single chopper with several secondary choppers for industrial applications needing more then a single induction motor. There is, therefore, an unmet need in the art for an efficient adjustable speed control for a motor allowing a one-to-many relationships between the primary chopper phase and the secondary chopper phase.

SUMMARY OF THE INVENTION

A programmable motor controller for receiving three-phase input power at an input power frequency and having a polarity is presented. The controller includes a primary chopper for reversing each phase of electrical power according to a reference frequency. Each primary chopper has a power input, a signal input, and an output. The power input is electrically connected in wye connection to each phase of power. A transformer for each phase of power has primary and secondary terminals and is connected electrically by its primary terminals to the output of the primary chopper. A secondary chopper for each phase of power is configured to reverse each phase or electrical power according to the reference frequency and phase shifted according to a second reference signal. The secondary chopper has an input connected electrically to the secondary terminals of the transformer in an output connected to a winding of a motor.

The invention modulates the, received input power by rapidly reversing its polarity at a frequency significantly higher then the frequency of the input power. Because the modulating frequency is significantly higher then the input frequency, the resulting waveform is a substantially square wave. Because the resulting waveform integrates to zero over time, use of the square wave avoids saturation of the isolation transformer. Additionally, because of the suitably high frequency, the transformers used for isolation can be much smaller than those used for conveying power at a grid frequency from 50 to 60 Hz.

The invention also allows more then one secondary chopper to be connected to the output of a single primary chopper, thereby allowing individual motor to be individually controlled within a single appliance without duplicating the hardware necessary for the primary chopper function.

The invention allows for the control of the frequency of the power fed to the motor and therefore the rotational frequency of the magnetic field within the stator. Appropriately controlling the rotational frequency of the magnetic field within the stator allows the optimization of the slip for efficiency.

The invention can also be used with synchronous or other AC machines and is not limited to induction motors though the advantages are most evident in conjunction with the induction machine.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, a programmable motor controller for receiving three-phase input power at an input power frequency and having a polarity is presented. The controller includes a primary chopper for reversing each phase of electrical power according to a reference frequency. Each primary chopper has a power input, a signal input, and an output. The power input is electrically connected in wye-connection to each phase of power. A transformer for each phase of power has primary and secondary terminals and is connected electrically by its primary terminals to the output of the primary chopper. A secondary chopper for each phase of power is configured to reverse each phase or electrical power according to the reference frequency and phase shifted according to a second reference signal. The secondary chopper has an input connected electrically to the secondary terminals of the transformer in an output connected to a winding of a motor.

Figure 1A:
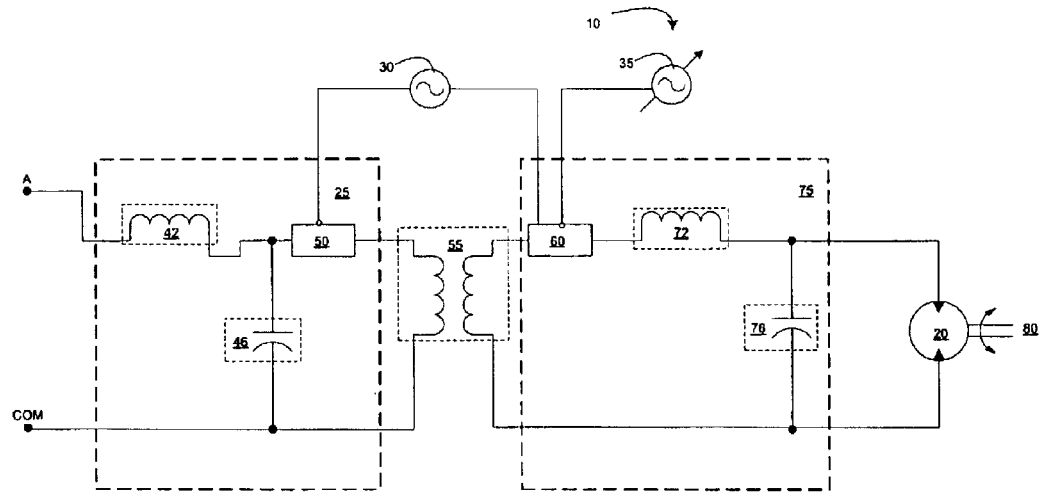
FIG. 1a is a schematic diagram of a single phase of a three-phase controller.

FIG. 1a is a schematic diagram of a single phase of a three-phase controller. Referring to FIG. 1a, three principal elements are evident: the primary chopper 25, the isolation transformer 55, and the secondary chopper 75. A clock oscillator 30 and a variable oscillator 35 provide timing and modulation signals to the primary chopper 25 and the secondary chopper 75.

Examining the primary chopper 25 and the secondary chopper 75 reveals a substantial symmetry in configuration and function. Within the primary chopper 25 are a primary filter inductor 42, a primary filter capacitor 46, and a primary gating array 50. The primary filter inductor 42 and the primary filter capacitor 46 serve to remove ripple frequencies from the live voltage. These filtering elements, the primary filter inductor 42 and the primary filter capacitor 46, are not necessary for the successful operation of the controller but are selected to suitably condition the power used for better operation of the inductive elements of the system such as the controlled motor 20.

The primary gating array 50 is any suitable array that will periodically reverse the filtered power based upon a clock signal. One such gating array is taught in U.S. Pat. No. 6,466,468 issued to Douglas York on Oct. 15, 2002 incorporated by this reference, but other suitable methods are also known to those skilled in the art. The minimal function necessary is to periodically reverse power fed to the gate according to the clock signal fed from the clock oscillator 30.

The transformer 55 is used to isolate the primary chopper 25 from the secondary chopper 75. The secondary gating array 60 effects the "multiplication of sines" more completely described in the discussion of FIG. 2 below enabling the frequency variability. The secondary chopper 75 reverses polarity in much the same manner as the primary chopper 25. To the extent that the primary chopper 25 and the secondary chopper 75 differ, it is only in the timing of the reversing of the provided power. The secondary chopper is out of phase with the primary chopper by an amount equal to quarter of a wavelength (this discussion presumes a sine-like wave with two zero-crossings in one wavelength) plus the instantaneous value of a modulating waveform received from the variable oscillator 35.

Like the primary chopper 25, the secondary chopper 75 includes low-pass filtering elements: a secondary filtering inductor 72 and a secondary filtering capacitor 76. The values for these filtering elements are selected to suitably energize the windings of the motor 20 without generating undue eddy currents. This is accomplished by removing the upper harmonics from the output of the secondary gating array 60. As a result, the motor 20 imparts torque to the rotor and shaft assembly 80 causing it to rotate.

Figure 1B:
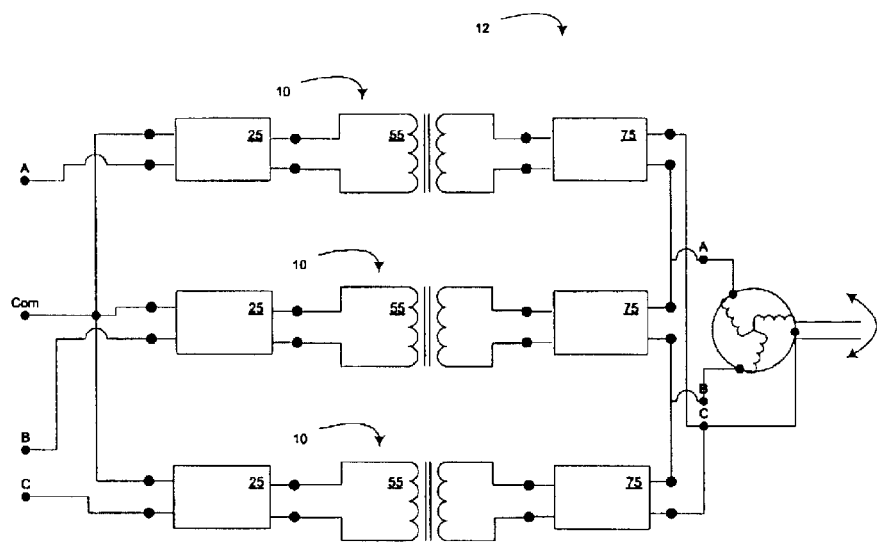
FIG. 1b is the general schematic of the three-phase controller.

FIG. 1b is the general schematic of the three-phase controller. Referring to FIGS. 1a and 1b shows the presence of the principal elements: the primary choppers 25, the at least two-winding transformers 55, and the secondary chopper 75. The purpose of the FIG. 1b is to demonstrate the wye-connection to the grid power and the delta connection to the windings of the three-phase motor 20.

Figure 2:
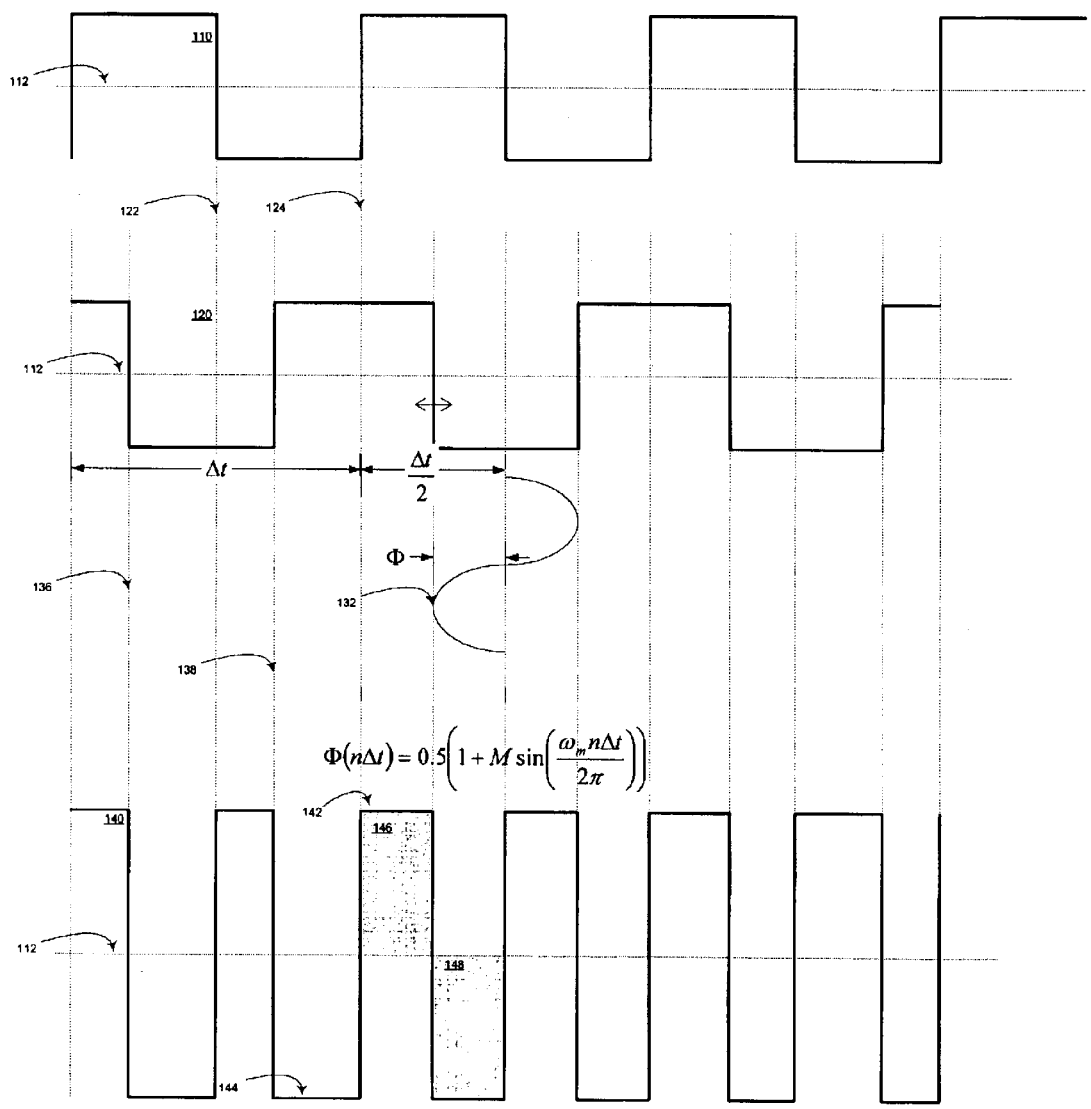
FIG. 2 is an exemplary wave-tracing diagram that shows the interplay of the primary and secondary choppers on a theoretical direct current input.

Referring to FIGS. 1a and 2, an exemplary wave-tracing diagram shows the interplay of the primary chopper 25 and secondary chopper 75 on a theoretical direct current input. While the present invention is based upon the geometric equations set forth in the teaching of U.S. Pat. No. 6,466,468 issued to Douglas York on Oct. 15, 2002, the chopping strategy used to effect the geometric equations is distinct. Rather than the chopping strategy taught in the patent where the phase and frequency of each of the choppers was determined by the desired power output frequency, the instant strategy frees the primary chopper from dependence upon the desired output frequency.

In the instant chopping strategy, the primary gating array 50 periodically reverses power according to the primary chopper signal trace 110. As the primary signal trace 110 is portrayed as a square-wave oscillating about the zero-voltage axis 112 from a positive voltage value to a negative voltage value of equal magnitude. As the gating array is only a switching array and has no amplifying component, the magnitude is dependant solely upon the input power. Thus, for illustrative purposes the square-wave oscillates from an arbitrary positive constant to the same arbitrary constant on the negative side showing the transmission of the input power and then its inverse.

The resulting primary chopper signal trace 110 demonstrates the square-wave character of the resulting power signal. Because the chopping clock signal comes from the clock oscillator 30, and the frequency of the clock oscillator signal is selected to be significantly higher than that of the input power, from one cycle to the next, there is very little deviation from a true square wave. The square-wave nature of the power output from the primary gating array 50 allows the power output to pass through the transformer 55 without saturating the core with flux, as might happen when the wave is unbalanced meaning it has a D.C. component.

For the purposes of the discussion, the square-wave input into the transformer 55, will be said to induce a square-wave output identical to the primary chopper trace 110, ignoring any inductive effects that might remove high frequency harmonics from the output wave. These inductive effects are not significant to the operation of the invention. To achieve the variability of frequency taught in the York patent incorporated above, the instant invention phase shifts the primary chopper trace 110 according to the equation:

$$\Phi(n\Delta t) = 0.5\left(1 + M \sin\left(\frac{\omega_m n \Delta t}{2\pi}\right)\right) \quad (1)$$

where $\Phi(n\Delta t)$ is the phase shift expressed as a function of time (specifically a fraction of one interval $\Delta t$), time being expressed as n intervals of length $\Delta t$ (the period of one wave received from the clock oscillator 30). As the modulating coefficient M is a real number whose value is bounded by 0 and 1 and represents the relation between the magnitude of the output power to the magnitude of the input power (recalling that there is no amplifying function in the primary gating array 50), the output of the $\Phi(n\Delta t)$ function is bounded by 0 and 1.

Thus, to phase shift the output of the clock oscillator 30 in accord with the Equation 1, the primary chopper trace 110 is phase shifted by one half of one cycle $$\frac{\Delta t}{2},$$

(representing the 0.5×1 portion of Equation 1) plus one-half of the product of M sin $$\left(\frac{\omega_m n \Delta t}{2\pi}\right),$$

where $\omega_m$ is a modulating frequency configured to produce a desired output frequency. The modulating frequency $\omega_m$ is expressed in radians per second and is divided by $2\pi$ to reduce the expression to one of revolutions per second. The secondary gating trace 120 represents the resulting wave. Thus, where the primary gating array 50 reverses polarity of the input power at times 122 on the fall and 124 on the rise of the primary gating trace 110, the secondary gating array 60 reverses power at the fall 136 and the rise 138 of the phase-shifted secondary gating trace 120.

When each of the primary gating array 50 and the secondary gating array 60 are in operation, the resulting gating trace 140 reverses at each of the times 122, 124, 136, and 138. Thus the output of the primary gating array 50 and the secondary gating array 60 is a power curve that vacillates from a maximum 142 to a minimum 144 determined by the input power. Integrating the resulting gating trace 140 over a single cycle is accomplished by subtracting the negative area 148 of the curve below the zero-voltage axis 112 from the positive area 146. Because 0.5×1 portion of Equation 1 is the same for the positive and negative portions, it cancels out of the equation.

Over one cycle, then, the result is M sin $$\left(\frac{\omega_m n \Delta t}{2\pi}\right).$$

Where M=1, i.e. all of the input power is applied to the output terminals at the windings of the motor 20, the resulting value over one cycle is sin $$\left(\frac{\omega_m n \Delta t}{2\pi}\right).$$

As this value is the amount of time the input power is applied to the output terminals at the motor 20, it can be said to be the product of the sinusoidal input power curve times sin $$\left(\frac{\omega_m n \Delta t}{2\pi}\right)$$

or the product of sines for each discrete interval $\Delta t$. Thus, by a distinct chopping strategy, the instant invention effects the geometric equations taught in the York patent.

Figure 3:
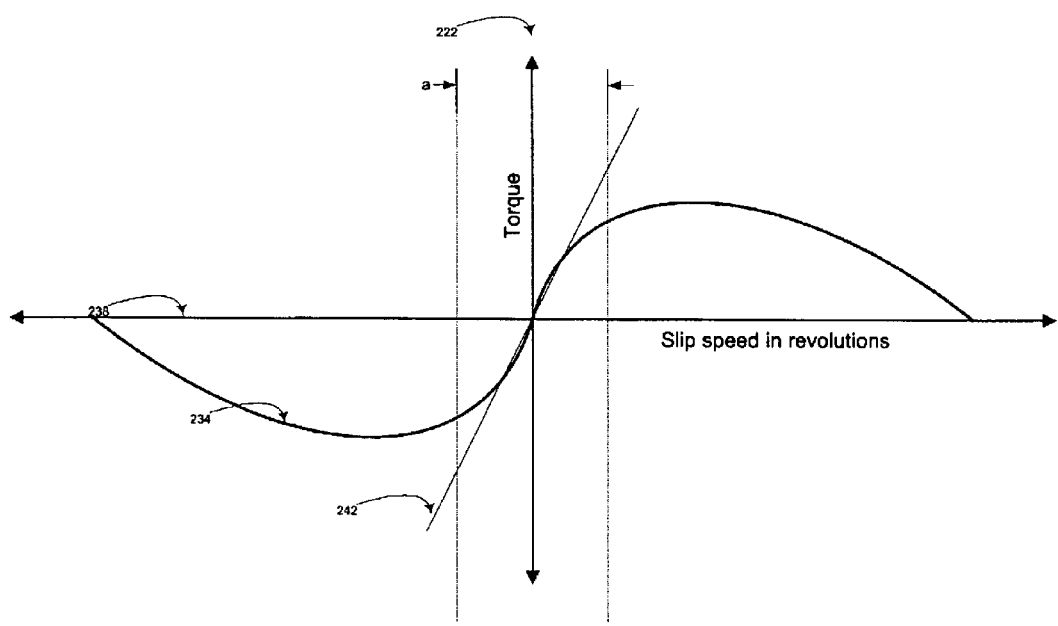
FIG. 3, is a graph showing the relationship between slip speed on an x-axis and slip on a y-axis.

Referring to FIGS. 1*a* and 3, is a graph of a curve 234 showing the relationship between slip speed on an x-axis 238 and torque on a y-axis 222. Slip speed is the difference between the rotational speed of the rotating magnetic field in an induction motor stator and the rotational speed of the rotor. Slip is represented along the y-axis 222. Torque is a force that produces or tends to produce rotation or torsion. In this graph, the torque has a positive value when the motor is turning a shaft and a negative value when the shaft is turned by outside forces. The axes cross at a point where the rotational speed of the magnetic field and the rotational speed of the shaft are the same; it is noteworthy that this does not always occur at zero but might occur at any speed so long as the shaft speed and to rotational magnetic field speed are the same. At any point where the shaft exceeds the rotational speed of the magnetic field, the slip speed will be negative.

Within a region $\alpha$ centered about the y-axis, the relationship between slip speed and torque roughly defines a line 242. In the region $\alpha$, the linearity of the relationship allows optimal control and efficiency. By selecting a modulating frequency $\omega_m$ suitably, the rotational speed of the magnetic field which depends upon the output frequency of power in the windings of the motor 20, which in turn depends upon the modulating frequency $\omega_m$, will remain within the linear region $\alpha$ as the motor 20 operates.

In one presently preferred embodiment, the modulating frequency $\omega_m$ is constantly varied by means of a closed feedback loop. One embodiment of the feedback loop uses a sensor for rotational speed of the shaft 80. In operation, the feedback loop seeks to maintain the rotational speed under a varying load by modulating the modulating frequency $\omega_m$. Another embodiment places a stress sensor on the shaft 80 and modulates the modulating frequency $\omega_m$ to optimize torque. Another embodiment senses current through a winding of the motor 20 and controls it within a specified range. Still another embodiment monitors the power factor by comparing the zero-crossings of current into a winding of the motor 20 and the voltage across the winding and computing a phase angle, the feedback loop seeks to optimize the power factor by modulating the modulating frequency $\omega_m$.

Figure 4:
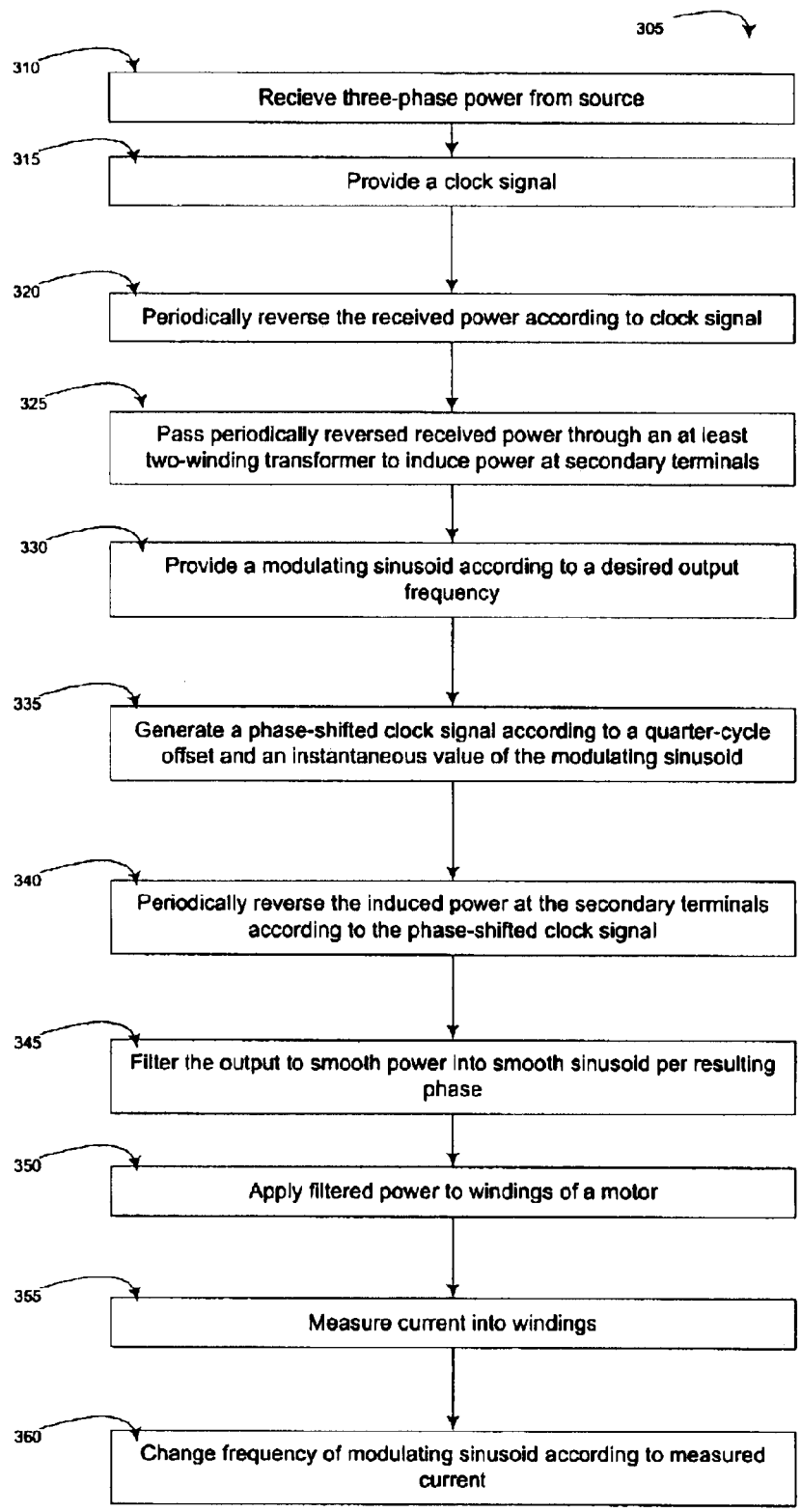
FIG. 4 is a flow-chart showing the method of modulating power using the primary and secondary choppers.

Referring to FIG. 4, FIG. 4 is a flow-chart showing a presently preferred method 305 of modulating power using the primary and secondary choppers. At a block 310, the method receives power from a power source such as a grid. The grid provides three-phase power at a wye-connected terminal set, each phase of power being alternating current, i.e. voltage for each phase is sinusoidal having a frequency with an offset from the others by a factor of $$\frac{2\pi}{3}.$$

At a block 315, a clock signal with a frequency that significantly exceeds that of the received power is generated. The clock signal will be used to drive a primary chopper and a secondary chopper.

At a block 320, the received power is periodically reversed at the primary chopper according to the clock signal. The periodically reversed power approximates a square-wave. The square-wave is passed through a transformer having primary and secondary terminals at a block 325 to provide isolation between the primary and secondary choppers. Power is input at the primary and output at the secondary terminals.

At a block 330, a modulating wave is generated at a modulating frequency configured to produce an output power at a desired frequency. At a block 335, the clock frequency is phase-shifted by a fractional portion of a period of the clock signal according to one half of one wavelength plus the instantaneous value of the modulating wave. The resulting phase-shifted clock signal is used to time the periodic reversal of the power presented at the secondary terminals of the transformer by means of a secondary chopper at a block 340.

At a block 345, the chopped power is filtered with a low-pass filter to remove higher order harmonics that would, if allowed to reach the motor, only serve to heat the iron cores of the windings rather than to turn the shaft of the motor. Once suitably filtered, at a block 350, the power is applied to the windings of the motor.

In order to exploit the variability of the output power, at a block 355, the controller is configured to measure current in the windings of the motor in one presently preferred embodiment. At a block 360, the modulating frequency of the modulating wave generated at the block 330 is modified to optimize the current in the windings.

While the preferred embodiment of the invention has been illustrated and described, as noted above, many changes can be made without departing from the spirit and scope of the invention. For example, the invention can also be used with synchronous or other AC machines and is not limited to induction motors though the advantages are most evident in conjunction with the induction machine. Accordingly, the scope of the invention is not limited by the disclosure of the preferred embodiment. Instead, the invention should be determined entirely by reference to the claims that follow.

What is claimed is:

1. A programmable motor controller receiving three-phase input power at an input power frequency and having a polarity, the controller comprising:
    a primary chopper for reversing each phase of electrical power according to a reference frequency, each primary chopper having a power input, a signal input, and an output, the power input being electrically connected in wye-connection to each phase of power;
    a transformer for each phase of power, each transformer having primary and secondary terminals and connected electrically by its primary terminals to the output of the primary chopper; and
    a secondary chopper for each phase of power, the secondary chopper configured to reverse each phase of electrical power according to the reference frequency and phase shifted according to a second reference signal, the secondary chopper having an input connected electrically to the secondary terminals of the transformer and an output connected to a winding of a motor.

2. The motor controller of claim 1, further comprising: a processor; and
    a first sensor for at least one phase of power, the first sensor being configured to measure an electrical current flowing into the winding.

3. The motor controller of claim 1, wherein the processor generates the second reference signal according to the measured current at the first sensor.

4. The motor controller of claim 3, further comprising a second sensor for measuring voltage across the winding, and wherein the processor further bases the generated second reference signal according to the measured voltage at the second sensor.

5. The motor controller of claim 4, wherein the processor generates the second reference signal according to a relationship between the measured current and the measured voltage.

6. The motor controller of claim 5, wherein the relationship is expressed as a phase-angle.

7. The motor controller of claim 1, further comprising: a processor; and
    means for measuring output torque of the motor.

8. The motor controller of claim 7, wherein the measuring means includes a shaft-mounted stress sensor.

9. The motor controller of claim 7, wherein the measuring means includes an armature-mounted flux sensor.

10. The motor controller of controller of claim 1, further comprising: a processor; and
    a means for measuring slip of the motor.

11. A method for controlling power to a three-phase electrical motor, the method comprising:
    providing three-phase electrical power from a wye connected power source, each phase of electrical power being offset from the other phases of electrical power by phase-angles of $2\pi/3$ radians;
    reversing polarity of each phase of electrical power at a first frequency;
    applying the reversed polarity electrical power through an at least two-winding transformer having a set of primary terminals and a set of secondary terminals for each phase of electrical power, the primary terminals being configured to receive the reversed polarity electrical power, the secondary terminals being configured to induce an induced electrical power having a voltage and a current;
    generating a phase-angle-modulated first signal at the first frequency to correspond with each phase of the three-phase power;
    reversing polarity of each phase of the induced electrical power according to the generated phase-angle-modulated first signal; and
    applying the induced electrical power having a voltage and a current to a motor having terminals in delta connection, thereby causing the motor to rotate at an angular frequency and with a torque.

12. The method of claim 11, wherein the phase-angle modulation is based upon a desired value for the angular frequency.

13. The method of claim 12, wherein the angular frequency is selected to optimize the torque.

14. The method of claim 11, wherein the motor is an induction motor and the phase-angle-modulation is selected to optimize slip of the induction motor.

15. The method of claim 11, wherein the method includes the additional steps of further compressing sensing the current, and wherein the phase-angle modulation is further based upon the sensed current.

16. The method of claim 15, wherein the phase-angle modulation is selected to optimize the sensed current.

17. The method of claim 11, wherein the method includes the additional steps of further comprising sensing the current and voltage, and wherein the phase-angle-modulation is further based upon the sensed current and voltage.

18. The method of claim 17, wherein the sensed current and voltage define an angular relationship, and the phase-angle-modulation is selected to optimize the angular relationship.

19. The method of claim 17, wherein the angular relationship is optimized via a feed-back loop.

20. The method of claim 17, wherein the angular relationship is optimized via a look-up table.

21. The method of claim 11, wherein the method includes the additional steps of further comprising sensing motor slip, and wherein the phase-angle modulation is based upon to the sensed slip.

22. A motor controller for controlling an alternating current motor, the controller comprising:

a primary clock configured to generate a clock signal;

a secondary clock configured to phase-shift the clock signal to generate a phase-shifted clock signal;

a primary gating array, the primary gating array having primary input terminals and primary output terminals and configured to periodically reverse power received at the primary input terminals and presented at the primary output terminals according to the clock signal;

a transformer having at least two windings and having primary transformer terminals and secondary transformer terminals, the primary transformer terminals electrically connected to the primary output terminals;

a secondary gating array, the primary gating array having secondary input terminals and secondary output terminals and configured to periodically reverse power received at the secondary input terminals and presented at the secondary output terminals according to the phase-shifted clock signal, the secondary input terminals electrically connected to the secondary transformer terminals.

23. The controller of claim 22, wherein, the secondary clock phase-shifts the clock signal according to a reference sinusoid.

24. The controller of claim 23, wherein the reference sinusoid is configured to produce power presented at the secondary output terminals having a desired frequency.

25. The controller of claim 24, wherein the desired frequency is selected to optimize the operation of a motor.

26. The controller of claim 25, wherein the motor is an induction motor and wherein to optimize is to limit slip in the motor.

* * * * *